US009578551B2

(12) United States Patent
Le Clech et al.

(10) Patent No.: US 9,578,551 B2
(45) Date of Patent: Feb. 21, 2017

(54) METHOD AND APPARATUSES FOR ESTABLISHING A LINK BETWEEN TWO DEVICES

(75) Inventors: Fabien Le Clech, Issy les Moulineaux (FR); Frederic Jounay, Pleumeur Bodou (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 13/805,320

(22) PCT Filed: Jun. 29, 2011

(86) PCT No.: PCT/FR2011/051506
§ 371 (c)(1),
(2), (4) Date: Dec. 18, 2012

(87) PCT Pub. No.: WO2012/001297
PCT Pub. Date: Jan. 5, 2012

(65) Prior Publication Data
US 2013/0094474 A1    Apr. 18, 2013

(30) Foreign Application Priority Data
Jun. 30, 2010 (FR) .................................... 10 02748

(51) Int. Cl.
*H04W 76/02*     (2009.01)
*H04W 36/00*    (2009.01)
(Continued)

(52) U.S. Cl.
CPC ......... *H04W 36/0016* (2013.01); *H04W 76/02* (2013.01); *H04W 8/26* (2013.01); *H04W 40/36* (2013.01); *H04W 48/20* (2013.01)

(58) Field of Classification Search
CPC ....... H04W 80/04; H04W 36/18; H04W 40/36
(Continued)

(56) References Cited

U.S. PATENT DOCUMENTS

2003/0013450 A1*  1/2003  Wang et al. .................. 455/442
2004/0165551 A1*  8/2004  Krishnamurthi et al. .... 370/328
(Continued)

OTHER PUBLICATIONS

3GPP TSG-RAN WG Meeting #70, May 14, 2010,36.300 CR 0240 VS 9.3.0.*
(Continued)

*Primary Examiner* — Omar Ghowrwal
*Assistant Examiner* — Angel Brockman
(74) *Attorney, Agent, or Firm* — Knobbe, Martens, Olson & Bear LLP

(57) ABSTRACT

The invention relates to a method for establishing a link through which at least one data stream is to be transmitted. A first communication facility and a second communication facility form a first and second end of the link, respectively. A first base station is connected to the first communication facility, and a second base station is connected to the second communication facility, the first base station having preselected the second base station from among a plurality of base stations. The method includes the following steps, implemented by the first communication facility: extracting an identifier of the first base station and an identifier of the second base station, said identifiers being included in a message transmitted by the first base station; and establishing the link between the first communication facility and the second communication facility from the extracted identifier of the first base station and the extracted identifier of the second base station.

6 Claims, 4 Drawing Sheets

Figure 1:
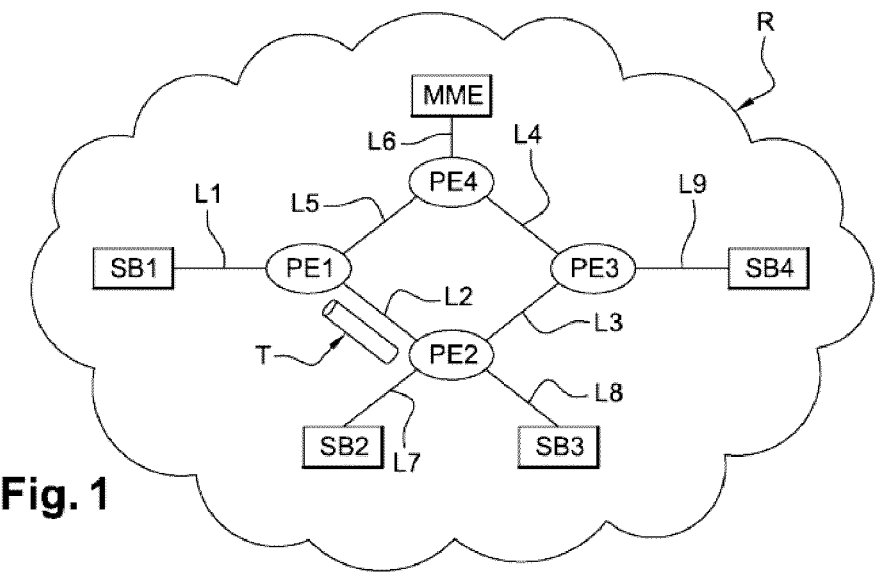

(51) Int. Cl.
    *H04W 8/26* (2009.01)
    *H04W 40/36* (2009.01)
    *H04W 48/20* (2009.01)

(58) Field of Classification Search
    USPC .................................................. 370/331, 328
    See application file for complete search history.

(56) References Cited

U.S. PATENT DOCUMENTS

| | | |
|---|---|---|
| 2008/0130571 A1 | 6/2008 | Maeda |
| 2008/0311911 A1* | 12/2008 | Koodli et al. ................. 455/436 |
| 2009/0252088 A1 | 10/2009 | Rao |
| 2009/0268661 A1* | 10/2009 | Ng et al. ........................ 370/328 |
| 2010/0027508 A1* | 2/2010 | Jee et al. ....................... 370/331 |
| 2010/0067486 A1* | 3/2010 | Masuda ........................ 370/331 |

OTHER PUBLICATIONS

3GPP TSG WSG Meting #70, May 14, 2010, 36.300 CR 0246 VS 9.3.0.*
International Search Report and Written Opinion dated Sep. 22, 2011 in International Application No. PCT/FR2011/051506 in 10 pages.

* cited by examiner

METHOD AND APPARATUSES FOR ESTABLISHING A LINK BETWEEN TWO DEVICES

This application is a national stage application under 35 U.S.C. §371, claiming priority to International Application No. PCT/FR2011/051506, having an international filing date of Jun. 29, 2011, and published as International Publication No. WO 2012/001297 A1, which claims priority to French Patent Application No. 1002748, filed on Jun. 30, 2010, each of which is incorporated by reference herein in its entirety and for all purposes.

The invention relates to the field of telecommunications, and more particularly, to mobile access networks.

The document of the 3GPP (3rd Generation Partnership Project), reference TS 36.300 v.9.3.0 proposes developments relating to architectures for the mobile access network.

More precisely, the document TS 36.300 v.9.3.0 describes a mechanism known as ANR (Automatic Neighbor Relationship). Such an ANR mechanism is implemented by base stations with the aim of discovering neighboring base stations. The base stations capable of implementing the ANR mechanism comprise means of selecting, from amongst a plurality of neighboring base stations, one or more base stations offering a radio coverage guaranteeing a satisfactory level of quality of service and that are able to be candidates with a view to the attachment of a mobile terminal during a cell handover procedure or for exchanging data between neighboring base stations in order to optimize the management of the radio resources of a mobile access network. Thus, when a first base station selects a second base station, referred to as neighboring base station, by implementing the ANR mechanism, the first base station informs a Mobility Management Entity or MME of this fact which entity in turn informs the second base station of this. Such a solution offers flexibility in the selection, by the first base station, of a candidate base station with a view to the attachment of a mobile terminal during a handover procedure or during exchanges of data between base stations.

Such a solution allows a dynamic selection of the second base station. Indeed, the selection of the second base station is based on measurements of radio reception power reported by various mobile terminals connected to the first base station rather than on the basis of parameter determinations carried out during the start-up phase of the mobile communications network.

The neighboring base stations being predefined by parameter setup in the first base station, the data transfer scheme is also predefined as a function of the setup.

Thus, when the first base station implements the ANR mechanism, the transfer scheme is not adapted. Indeed, a base station considered as a neighbor of the first base station during the parameter setup of the latter might not be a neighboring base station when the first base station implements the ANR mechanism and vice versa. Consequently, the transfer scheme for the data is not adapted to the needs of the base stations when the latter implement the ANR mechanism.

One of the aims of the invention is to overcome the drawbacks of the prior art.

For this purpose, the invention provides a method for establishing a link in the OSI layer 2 or 3 via which at least one data stream is intended to be transmitted, a first unit of communications equipment and a second unit of communications equipment respectively forming a first and a second end of the link, a first base station being connected to the first unit of communications equipment, and a second base station being connected to the second unit of communications equipment, characterized in that, the first base station having selected the second base station from amongst a plurality of base stations in anticipation of a handover procedure, the method comprises the following steps implemented by the first unit of communications equipment:

extraction of an identifier of the first base station and of an identifier of the second base station comprised in a message sent by the first base station, establishment of the link between the first unit of communications equipment and the second unit of communications equipment based on the identifier of the first base station and on the identifier of the second base station extracted.

Such a solution allows the transfer scheme for the data to be adapted to the needs of the base stations when the latter have identified the base station or stations that may be candidates with a view to the attachment of a mobile terminal during a handover procedure or exchanges of data between neighboring base stations. In the framework of the invention, a link is understood to mean a logical link supported by a physical connection such as a section of optical fiber or a copper pair. In the framework of the invention, a link is an OSI (Open Systems Interconnection) model connectivity of level 2 or of level 3 such as defined by the ISO (International Standards Organization). It will be noted that, in the framework of the invention, a base station is connected to a unit of communications equipment by this type of link.

The establishment of a link intended to transmit data between a first and a second base station is triggered once the second base station has been selected as a neighboring base station by the first base station in contrast to the architectures of the prior art.

It may also be noted that, in a second step, the method is also implemented symmetrically by the second unit of equipment in order to establish the link in the other direction, in other words between the second and the first unit of equipment.

Indeed, the second base station having initially selected the first base station from amongst a plurality of base stations, the method comprises the following steps implemented by the second unit of communications equipment:

extraction of an identifier of the second base station and of an identifier of the first base station comprised in a message sent by the second base station, establishment of the link between the second unit of communications equipment and the first unit of communications equipment based on the identifier of the second base station and on the identifier of the first base station extracted.

When the method is implemented by the first unit of equipment, the selection of the second base station is carried out by the first base station on the basis of information uploaded by the mobile terminal in the framework of the ANR mechanism previously described.

When the method is implemented by the second equipment, the selection of the first base station is carried out by the second base station on the basis of information downloaded from a unit of equipment of the network responsible for the management of the mobility of the mobile terminals such as a mobility management equipment MME.

The subject of the invention is a solution that thus allows resources of the network to be saved because only links intended to transmit a data stream between two units of communications equipment are established avoiding an unnecessary reservation of the resources of the network in contrast to the architecture model known as 'full-mesh architecture'. In such an architecture model, links are established between all the communications equipment in such a manner that data streams can be exchanged between all the base stations then consuming resources of the network without this being necessary.

The solution which is the subject of the invention also offers a flexibility in the establishment of the links since the latter is done as needed; such a solution is thus advantageous during the use of the network in contrast to the architecture model known as 'partial-mesh architecture'. In such an architecture model, links are established between certain units of communications equipment when the network is put into service. Such links are established statically such that the resources associated with these links are used even if the link becomes obsolete during the use of the network or, conversely, links are not established even though they prove to be useful. This solution implies a tight relationship between various units of equipment of the network which must update their respective manager with regard to the topology of the mobile access network.

In one embodiment of the invention, the first unit of communications equipment intercepts a message sent by the first base station to a unit of equipment of the network responsible for the management of the mobility of the mobile terminals such as a mobility management equipment MME.

In another embodiment, in addition to the message sent to a mobility management equipment MME, the first base station also sends a specific message to the first unit of communications equipment.

According to one feature of the method for establishing a link which is a subject of the invention, the phase for establishing the link comprises:
 a step for broadcasting, to a plurality of communications equipment, the identifier of the first base station, as an identifier of a route allowing a connection to the first base station,
 a step for comparison of an identifier of another base station, broadcast to a plurality of communications equipment including the first unit of communications equipment, by another unit of communications equipment as an identifier of a route allowing a connection to the other base station, with the identifier of the second base station extracted,
 in the case where the identifier of the base station broadcast is identical to the identifier of the second base station extracted, a step for storing the identifier of the route allowing a connection to the second base station.

The first unit of communications equipment broadcasts the identifier of the first base station to other communications equipment with a view to establishing a link with a unit of communications equipment connected to a base station that may be a candidate with a view to the attachment of a mobile terminal during a handover procedure or exchanges of data between neighboring base stations.

Thus, when the first unit of communications equipment receives a message broadcast by another unit of communications equipment comprising the identifier of another base station, it compares this identifier with the identifier of the second base station. If the identifier of the other base station comprised in the message broadcast corresponds to the identifier of the second base station associated with the identifier of the first base station by the first unit of communications equipment, then the establishment of the link between the first and the second unit of communications equipment is completed and the link is established.

According to one feature of the method for establishing a link which is a subject of the invention, the phase for establishing the link comprises:
 a step for creating a first point of attachment in the first unit of communications equipment intended to form the first end of the link,
 a step for determining an identifier of a second point of attachment in the second unit of communications equipment intended to form the second end of the link,
 a step for sending a request for establishing the link to the second unit of communications equipment, the request for establishing the link comprising the identifier of the first point of attachment and the identifier of the second point of attachment.

In this embodiment, the link intended to be established between the first and the second unit of communications equipment, which is a pseudo-link such as defined in a document of the IETF (Internet Engineering Task Force, a grouping for standardization of the Internet), referenced RFC 3985 (RFC stands for "Request For Comments") under the term "pseudo-wire", allows the transmission of packets of data not conforming to the IP protocol, such as for example packets of data conforming to the Ethernet protocol.

The invention further relates to a method for communicating between a base station and a unit of communications equipment to which the base station is connected, the base station selecting from amongst a plurality of base stations, in anticipation of a handover procedure, a second base station connected to a second unit of communications equipment, a link in the OSI layer 2 or 3 via which at least one data stream is intended to be transmitted, the link being intended to be established between the first and the second unit of communications equipment, characterized in that the method comprises a step for sending a message, to the first unit of communications equipment, comprising an identifier of the first base station and an identifier of the second base station.

The base station communicates with the first unit of equipment by means of protocols such as the BGP (Border Gateway Protocol) which is a protocol for exchange of routes. Conventionally, the base station informs the first unit of communications equipment of its IP prefixes. In the framework of the invention, the BGP messages exchanged between the first base station and the first unit of communications equipment comprise at least one additional field in which an identifier of the first base station and an identifier of the second base station are specified.

It may be noted that this method of communication is also implemented symmetrically by the second base station in order to establish the link in the other direction, in other words between the second and the first unit of equipment.

The invention also relates to a unit of communications equipment forming a first end of a link in the OSI layer 2 or 3 via which at least one data stream is intended to be transmitted, a second unit of communications equipment forming a second end of the link, a first base station being connected to the unit of communications equipment, and a second base station being connected to the second unit of communications equipment, characterized in that, the first base station having selected the second base station from amongst a plurality of base stations in anticipation of a handover procedure, the unit of communications equipment comprises:

means of extraction of an identifier of the first base station and of an identifier of the second base station comprised in a message sent by the first base station, means for establishing the link between the first unit of communications equipment and the second unit of communications equipment based on the identifier of the first base station and on the identifier of the second base station extracted.

Finally, another subject of the invention is a base station, connected to a first unit of communications equipment, selecting from amongst a plurality of base stations, in anticipation of a handover procedure, a second base station connected to a second unit of communications equipment, a link in the OSI layer 2 or 3 via which at least one data stream is intended to be transmitted, the link being intended to be established between the first and the second unit of communications equipment, characterized in that it comprises means for sending, to the first unit of communications equipment, a message comprising an identifier of the base station and an identifier of the second base station.

In one variant, the message also comprises a parameter indicating that the identifier of the base station is intended to be used for the establishment of the link.

According to other aspects, the invention also relates to computer programs comprising program code instructions for the implementation of the steps of the link establishment and communication methods previously described, when these programs are executed by a computer.

Each of the computer programs described hereinabove can use any given programming language, and may be in the form of source code, object code, or of a code intermediate between source code and object code, such as in a partially compiled form, or in any other desired form.

The invention is also aimed at a recording medium readable by a computer on which a computer program such as previously described is recorded.

The information medium may be any given entity or device capable of storing the program. For example, the medium can comprise a storage means, such as a ROM (for "Read Only Memory"), for example a CD ROM or a microelectronic circuit ROM, or again a means of magnetic recording, for example a diskette (floppy disk) or a hard disk.

On the other hand, the information medium can be a transmissible medium such as an electrical or optical signal, which may be transported via an electrical or optical cable, by radio or by other means. The program according to the invention may in particular be downloaded/uploaded over a network of the Internet type.

Alternatively, the information medium may be an integrated circuit into which the program is incorporated, the circuit being designed to execute or to be used in the execution of the method in question.

Figure 2:
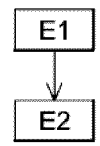
Figure 3A:
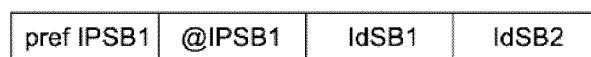
Figure 3B:
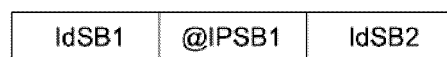
Figure 4:
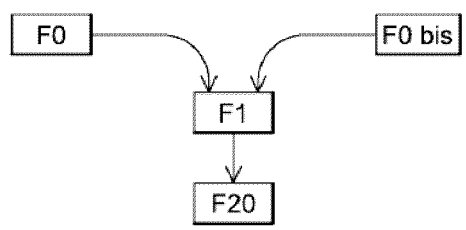
Figure 5:
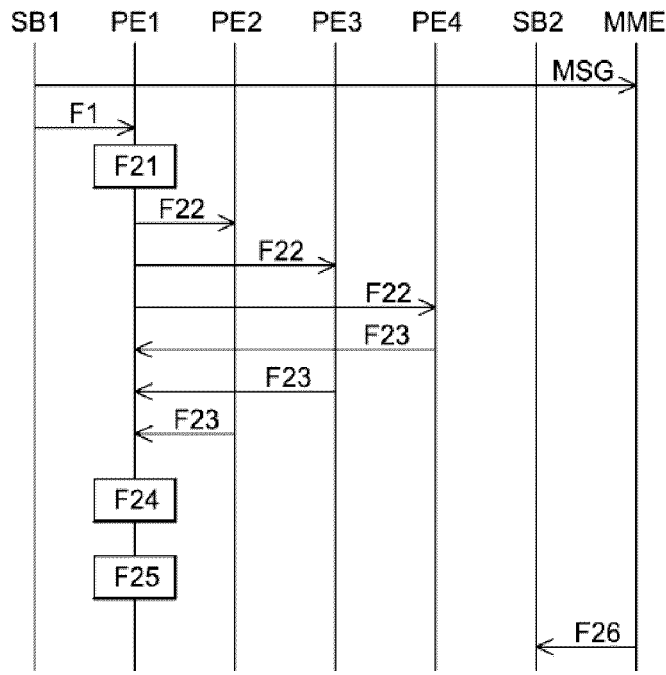
Figure 6:
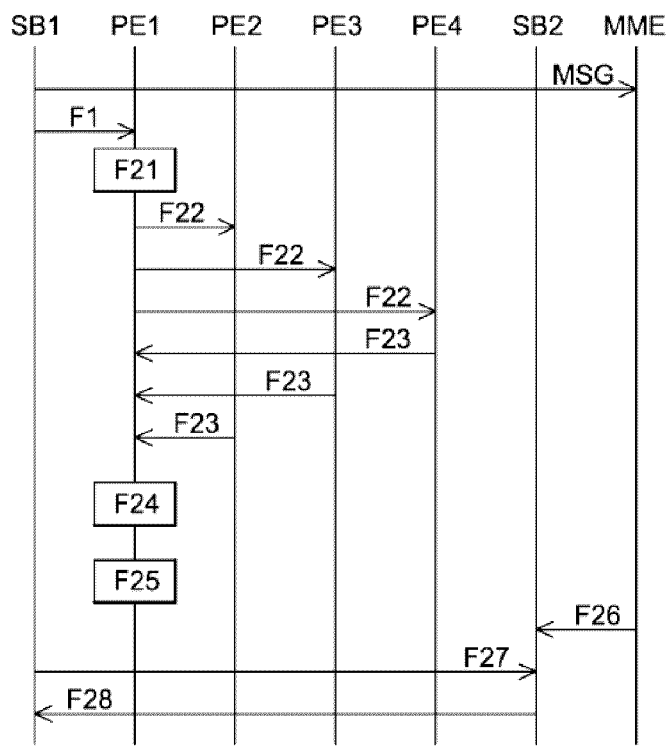
Figure 7:
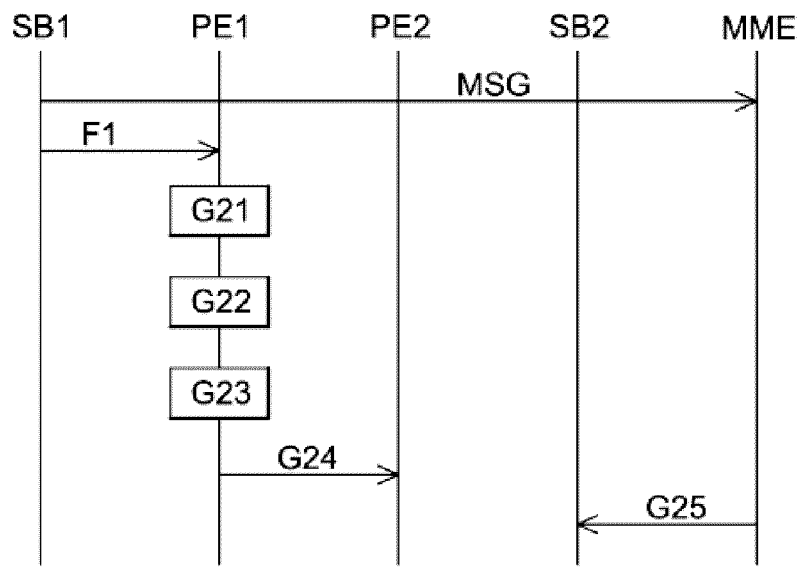
Figure 8:
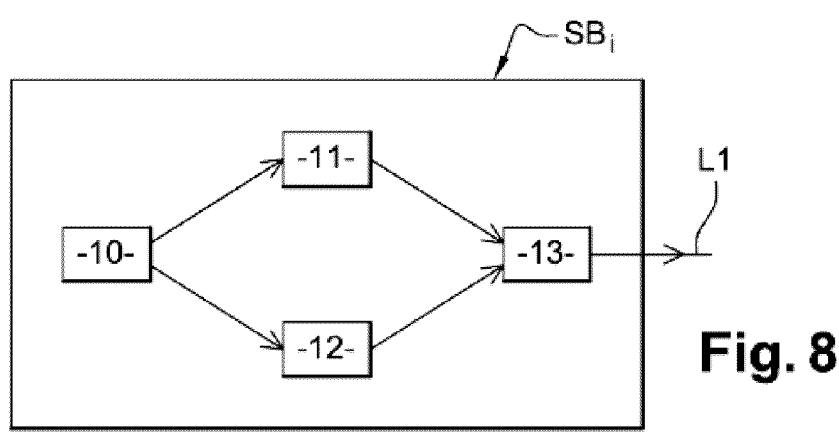
Figure 9A:
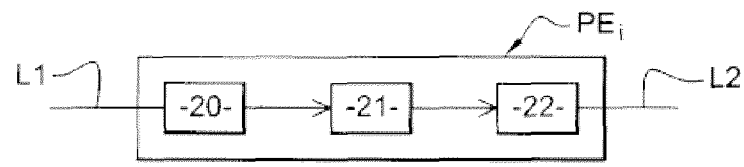
Figure 9B:
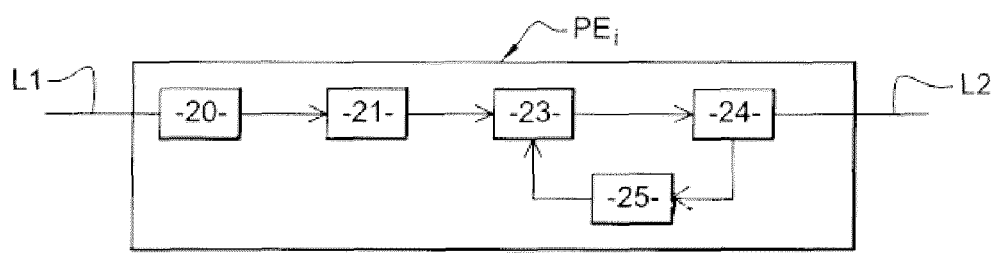
Figure 9C:
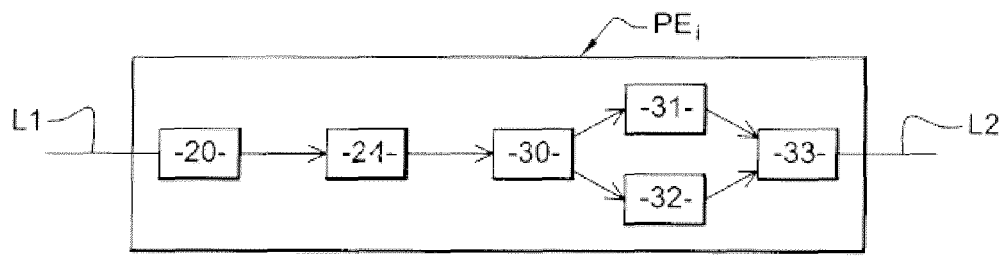

Other features and advantages will become apparent upon reading embodiments described with reference to the drawings in which:

FIG. 1 shows a mobile access network in which the method for establishing a link and the method of communication are implemented, FIG. 2 shows the steps of the method of communication, FIGS. 3A and 3B show messages sent by the base station to the communications equipment, FIG. 4 shows the steps of the method for establishing a link, FIG. 5 shows a diagram of the exchanges between the various units of equipment of the mobile access network in a first embodiment, FIG. 6 shows a diagram of the exchanges between the various units of equipment of the mobile access network in a second embodiment, FIG. 7 shows a diagram of the exchanges between the various units of equipment of the mobile access network in a third embodiment, FIG. 8 shows a base station implementing the method of communication which is a subject of the invention, FIGS. 9A, 9B, and 9C show a unit of communications equipment implementing the method for establishing a link which is a subject of the invention.

FIG. 1 shows a mobile access network R in which the link establishment and communication methods which are the subjects of the invention are implemented.

Such a mobile access network R comprises a plurality of units of communications equipment $PE_i$, $i \in \{1, 4\}$ connected to one another by means of wired links such as copper pairs. Such units of communications equipment $PE_i$ are for example routers.

Thus, a first unit of communications equipment $PE_1$ is connected via a first link L2 to a second unit of communications equipment $PE_2$. The unit of communications equipment $PE_2$ is connected to a third unit of equipment $PE_3$ by means of a link L3. The unit of communications equipment $PE_3$ is connected, by means of a link L4, to a fourth unit of communications equipment $PE_4$. The equipment $PE_4$ is connected to the equipment $PE_1$ by means of a link L5.

A first base station $SB_1$ is connected to the unit of communications equipment $PE_1$ by means of a link L1 such as a section of a copper pair.

A second base station $SB_2$ is connected to the unit of communications equipment $PE_2$ by means of a link L7 such as a section of a copper pair.

A third base station $SB_3$ is connected to the unit of communications equipment $PE_2$ by means of a link L8 such as a section of a copper pair.

A fourth base station $SB_4$ is connected to the unit of communications equipment $PE_3$ by means of a link L9 such as a section of a copper pair.

A unit of equipment for mobility management MME is connected to the unit of communications equipment $PE_4$ by means of a link L6.

The base stations $SB_1$, $SB_2$, $SB_3$ and $SB_4$ implement the ANR mechanism for selecting, from amongst a plurality of neighboring base stations, one or more base stations, referred to as neighboring base stations, offering a radio coverage guaranteeing a satisfactory level of quality of service and which can be candidates with a view to the attachment of a mobile terminal during a cell handover procedure or for exchanging data between neighboring base stations in order to optimize the management of the radio resources of a mobile access network.

With reference to FIG. 2, in order to select a neighboring base station, the base station $SB_1$ implements the ANR mechanism. During a step E1, the base station $SB_1$ implements a step for selection of a neighboring base station from amongst the base stations $SB_2$, $SB_3$, $SB_4$. At the end of the step E1, the base station $SB_2$ is selected. The base station $SB_1$ is aware of an identifier $IdSB_2$ of the base station $SB_2$. Only the base stations not having already been selected by the first base station $SB_1$ and the base stations whose selection via the ANR mechanism is not prohibited by the operator manager of the network R can be selected by the base station $SB_1$.

Once the neighboring base station has been selected, during a step E2, the base station $SB_1$ sends a message MSG comprising an identifier of the first base station $IdSB_1$ and the identifier of the second base station $IdSB_2$.

In a first variant embodiment, the message MSG sent by the base station $SB_1$ is sent to the mobility management equipment MME.

In a second variant embodiment, the base station $SB_1$ sends, in addition to the message MSG, a second message MSG1 to the unit of communications equipment $PE_1$. Such a message MSG1 is for example a message conforming to the BGP (Border Gateway Protocol) protocol. However, such a message MSG1 comprises additional fields with respect to a message conforming to the conventional BGP protocol.

In a first variant embodiment shown in FIG. 3A, the message MSG1 comprises, in a first field known as NLRI field, IP prefixes of the base station $SB_1$, in a second field known as Next Hop an IP address @IP $SB_1$ chosen from amongst the IP prefixes pref IP $SB_1$ of the base station $SB_1$, and finally, in two new fields, the identifier of the first base station $IdSB_1$ and the identifier of the second base station $IdSB_2$.

In a second variant embodiment shown in FIG. 3B, the message MSG1 comprises, in a new NLRI field, the identifier $IdSB_1$ of the base station $SB_1$, in a second field known as Next Hop, an IP address @IP $SB_1$ of the base station $SB_1$, and finally, in a new field, the identifier of the second base station $IdSB_2$.

In one variant embodiment of the invention, the message MSG1 can be a message conforming to the OSPF (Open Shortest Path First), ISIS (Intermediate system to intermediate system) or else ANCP (Access Node Control Protocol) protocols. However, such a message MSG1 comprises an additional field with respect to messages conforming to these various conventional protocols.

The unit of communications equipment $PE_1$ then implements the method for establishing the link T between the unit of communications equipment $PE_1$ and the unit of communications equipment $PE_2$.

With reference to FIG. 4, the unit of communications equipment $PE_1$ extracts from the message MSG, MSG1, sent by the base station SB1, the identifier of the first base station $IdSB_1$ and the identifier of the second base station $IdSB_2$ comprised in the message sent by the first base station $SB_1$ during a step F1.

Once this information has been extracted from the message MSG, MSG1, sent by the base station $SB_1$, the unit of communications equipment $PE_1$ triggers the establishment of the link T during a step F20.

Such a method for establishing a link between a first unit of communications equipment $PE_1$ and a second unit of communications equipment $PE_2$ allows the transfer scheme for the data to be adapted to the needs of the base station $SB_1$ when the latter has identified the base station or stations that may be candidates with a view to the attachment of a mobile terminal during a cell handover procedure. It will therefore be understood that the base station $SB_1$ has selected at least one other base station in anticipation of a handover procedure.

In a first variant embodiment, the unit of communications equipment $PE_1$ intercepts the message MSG sent by the base station $SB_1$ to the equipment for management of the mobility MME during a step F0.

In a second variant embodiment, the unit of communications equipment receives the message MSG1 sent by the base station $SB_1$ during a step F0b.

In a first embodiment of the invention shown in FIG. 5, the link T to be established between the unit of communications equipment $PE_1$ and the unit of communications equipment $PE_2$ is an IP connectivity supplied by a L3VPN (Level 3 Virtual Private Networks) service such as defined in the document RFC4364. Such a solution relies on the implementation of MPLS (Multi-protocol Label Switching) technology for the transport of the data between the two ends of the link T. MPLS technology includes the addition, in a header of the data to be transmitted, of one or more labels containing information allowing the communications equipment of the network R to determine the next stage that the data must follow in order to reach its destination.

In this first embodiment of the invention, the unit of communications equipment $PE_1$ extracts from a message MSG, MSG1, sent by the base station $SB_1$, the identifier of the first base station $IdSB_1$, the identifier of the second base station $IdSB_2$ during the step F1.

During a step F21, the unit of communications equipment $PE_1$ stores the identifier $IdSB_1$ of the base station $SB_1$ and the identifier $IdSB_2$ of the base station $SB_2$.

During a step F22, the unit of communications equipment $PE_1$ broadcasts to the communications equipment $PE_2$, $PE_3$ and $PE_4$ the identifier of the first base station $IdSB_1$, as an identifier of a route allowing a connection to the first base station $SB_1$. According to the BGP routing protocol, such a route identifier is called a "Route Target".

During a step F23, the unit of communications equipment $PE_1$ receives, from the units of communications equipment $PE_2$, $PE_3$, $PE_4$, the respective identifiers of the base station $IdSB_2$, of the base station $IdSB_3$, and of the base station $IdSB_4$ as identifiers of routes respectively allowing connections to the base station $SB_2$, the base station $SB_3$, and the base station $SB_4$.

During a step F24, the unit of communications equipment $PE_1$ implements a step for comparison of the identifiers of the base stations $IdSB_2$, $IdSB_3$, and $IdSB_4$, received during the step F23 with the identifier of the second base station $IdSB_2$ extracted from the message MSG, MSG1.

In the case where one of the broadcast identifiers of base stations $IdSB_2$, $IdSB_3$ or $IdSB_4$ is identical to the identifier of the second base station $IdSB_2$ extracted from the message MSG, MSG1, the unit of communications equipment PE1 stores, during a step F25, the identifier $IdSB_2$ of the route allowing a connection to the second base station $SB_2$. This step for storing the route for reaching the second base station $SB_2$ completes the establishment of the link T between the first unit of communications equipment $PE_1$ and the second unit of communications equipment $PE_2$.

In parallel, the base station $SB_1$ sends a message MSG to the mobility management equipment MME. The message MSG comprises the identifier of the base station $SB_1$ and the identifier of the base station $SB_2$ together with information indicating that these two base stations $SB_1$, $SB_2$ are neighbors.

The mobility management equipment MME then transmits a message MSG' to the base station $BS_2$ during a step F26. This step allows the second base station $BS_2$ to obtain the identifier $IdSB_1$ of the first base station $SB_1$.

Upon receiving this message MSG', the steps F1 to F25 previously described are implemented by the unit of communications equipment $PE_2$ in order to establish the link T for the direction of communication—unit of communications equipment $PE_2$ toward unit of communications equipment $PE_1$—such that the link T is bidirectional.

Since the transport of the data via the link T is carried out according to the MPLS technique, each unit of communications equipment $PE_i$ of the network R is identified by a label $lbl_i$. This label $lbl_i$ allows any given unit of communications equipment $PE_i$ to establish a connectivity according to the MPLS technique with another unit of communications equipment.

Thus, once the link T is established between the units of communications equipment $PE_1$ and $PE_2$, the latter exchange their respective labels $lbl_1$ and $lbl_2$. The label $lbl_1$ is added by the second unit of communications equipment $PE_2$ in the header of the data intended to be sent toward the first unit of communications equipment $PE_1$ via the link T. Similarly, the label $lbl_2$ is added by the first unit of communications equipment $PE_1$ in the header of the data intended to be sent toward the second unit of communications equipment $PE_2$ via the link T.

In a second embodiment of the invention shown in FIG. 6, the link T to be established between the unit of communications equipment $PE_1$ and the unit of communications equipment $PE_2$ is an Ethernet connectivity supplied by the BGP L2VPN (Level 2 Virtual Private Networks) service such as defined in the document RFC4761.

Such a solution also relies on the implementation of MPLS technology for the transport of the data between the two ends of the link T.

In this second embodiment of the invention, the unit of communications equipment $PE_1$ extracts from a message MSG, MSG1, sent by the base station $SB_1$, the identifier of the first base station $IdSB_1$ and the identifier of the second base station $IdSB_2$ during the step F1.

During a step F21, the unit of communications equipment $PE_1$ stores the identifier $IdSB_1$ of the base station $SB_1$ and the identifier $IdSB_2$ of the base station $SB_2$.

During a step F22, the unit of communications equipment $PE_1$ broadcasts to the communications equipment $PE_2$, $PE_3$ and $PE_4$, the identifier of the first base station $IdSB_1$, as an identifier of a route allowing a connection to the first base station $SB_1$. According to the BGP routing protocol, such a route identifier is called a "Route Target". Thus, in this second embodiment of the invention, the route identifier used is the identifier of the base station $IdSB_1$.

During a step F23, the unit of communications equipment PE1 receives, from the communications equipment $PE_2$, $PE_3$, $PE_4$, the respective identifiers of the base station $IdSB_2$, of the base station $IdSB_3$, and of the base station $IdSB_4$, as route identifiers respectively allowing connections to the base station $SB_2$, the base station $SB_3$, and the base station $SB_4$.

During a step F24, the unit of communications equipment $PE_1$ implements a step for comparison of the identifiers of the base stations $IdSB_2$, $IdSB_3$, and $IdSB_4$, received during the step F23, with the identifier of the second base station $IdSB_2$ extracted from the message MSG, MSG1.

In the case where one of the broadcast identifiers of base stations $IdSB_2$, $IdSB_3$ or Id $SB_4$ is identical to the identifier of the second base station $IdSB_2$ extracted from the message MSG, MSG1, the unit of communications equipment $PE_1$ stores, during a step F25, the identifier $IdSB_2$ of the route allowing a connection to the second base station $SB_2$. This step for storing the route for reaching the second base station $SB_2$ completes the establishment of the link T between the first unit of communications equipment $PE_1$ and the second unit of communications equipment $PE_2$.

In parallel, the base station $SB_1$ sends a message MSG to the mobility management equipment MME. The message MSG comprises the identifier of the base station $SB_1$ and the identifier of the base station $SB_2$ together with information indicating that these two base stations $SB_1$, $SB_2$ are neighbors.

The mobility management equipment MME then transmits a message MSG' to the base station $BS_2$ during a step F26. This step allows the second base station $BS_2$ to obtain the identifier $IdSB_1$ of the first base station $SB_1$.

Upon receiving this message MSG', the steps F1 to F25 previously described are implemented by the unit of communications equipment $PE_2$ in order to establish the link T for the direction of communication—unit of communications equipment $PE_2$ toward unit of communications equipment $PE_1$—such that the link T is bidirectional.

Since the transport of the data via the link T is carried out according to the MPLS technique, each unit of communications equipment $PE_i$ of the network R is identified by a label $lbl_i$. This label $lbl_i$, allows any given unit of communications equipment $PE_i$ to establish a connectivity according to the MPLS technique with another unit of communications equipment.

Thus, once the link T is established between the unit of communications equipment $PE_1$ and $PE_2$, the latter exchange their respective labels $lbl_1$ and $lbl_2$. The label $lbl_1$ is added by the second unit of communications equipment $PE_2$ in the header of the data intended to be sent toward the first unit of communications equipment $PE_1$ via the link T. Similarly, the label $lbl_2$ is added by the first unit of communications equipment $PE_1$ in the header of the data intended to be sent to the second unit of communications equipment $PE_2$ via the link T.

Since the link T thus established is an Ethernet connectivity, in order to be able to transmit data between the unit of communications equipment $PE_1$ and the unit of communications equipment $PE_2$, the base stations $SB_1$ and $SB_2$ must inform one other of their physical addresses. A physical address is for example a level 2 address such as a MAC (Medium Access Control) address.

For this purpose, the base stations $SB_1$ and $SB_2$ exchange requests conforming to the ARP (Address Resolution Protocol) protocol via the link T during steps F27 and F28 allowing the MAC addresses of the base stations $SB_1$ and $SB_2$ to be learnt. Once the physical addresses of the base stations $SB_1$ and $SB_2$ have been stored by the unit of communications equipment $PE_1$ and $PE_2$ in a VSI (Virtual Switching Instance) table, the transmission of the data is possible.

During the transmission of data from the base station $SB_1$ to the base station $SB_2$, the unit of communications equipment $PE_1$ adds the label $lbl_1$ in the header of the data intended to be sent to the base station $SB_2$ together with the physical address of the base station $SB_2$ in order that the data sent are received on the port of the unit of communications equipment $PE_2$ corresponding to the base station $BS_2$.

In a third embodiment of the invention shown in FIG. 7, the link T to be established between the unit of communications equipment $PE_1$ and the unit of communications equipment $PE_2$ is a pseudo-link MPLS such as defined in the document RFC 3985 by the term "pseudo-wire", allowing an Ethernet connectivity supplied by the LDP L2VPN (Level 2 Virtual Private Networks) service such as defined in the document RFC 4762.

In this third embodiment of the invention, the unit of communications equipment $PE_1$ extracts from a message MSG, MSG1, sent by the base station $SB_1$, the identifier of the first base station $IdSB_1$, the identifier of the second base station $IdSB_2$ during the step F1.

During a step G21, the unit of communications equipment $PE_1$ stores the identifier $IdSB_1$ of the base station $SB_1$ and the identifier $IdSB_2$ of the base station $SB_2$.

During a step G22, the unit of communications equipment $PE_1$ creates a first point of attachment SAII of the pseudo-wire in the first unit of communications equipment $PE_1$. Such a point of attachment has as identifier the identifier of the base station $IdSB_1$.

During a step G23, the first unit of communications equipment $PE_1$ determines an identifier of a second point of attachment TAII of the pseudo-wire in the second unit of communications equipment $PE_2$; such an identifier of the point of attachment TAII is the identifier of the base station $IdSB_2$ comprised in the message MSG, MSG1.

The establishment of the pseudo-wire is at the initiative of the first unit of communications equipment $PE_1$ and relies, for example, on the exchange of requests for establishing a link conforming to the T-LDP (Label Distribution Protocol) protocol defined in the document of the IETF reference RFC 4447.

Thus, a first request for establishing the link SIG1 of the pseudo-wire is sent by the unit of communications equipment $PE_1$ to the unit of communications equipment $PE_2$ during a step G24. This first request for establishing the link SIG1 comprises the identifier SAII of the first point of attachment of the pseudo-wire on the unit of communications equipment $PE_1$, and the identifier TAII of the second point of attachment of the pseudo-wire on the unit of communications equipment $PE_2$. All of this information constitutes an FEC (Forwarding Equivalent Class) identifying the pseudo-wire T. The request for establishing the link SIG1 also comprises a label $lbl_1$.

The SAII and TAII of the points of attachment of the pseudo-wire T on the units of communications equipment $PE_1$, $PE_2$ allow the request for establishing the link SIG1 to be routed between the units of communications equipment $PE_1$ and $PE_2$.

In parallel, the base station $SB_1$ sends a message MSG to the mobility management equipment MME. The message MSG comprises the identifier of the base station $SB_1$ and the identifier of the base station $SB_2$ together with information indicating that these two base stations $SB_1$, $SB_2$ are neighbors.

The mobility management equipment MME then transmits a message MSG' to the base station $SB_2$ during a step G25. This step allows the second base station $SB_2$ to obtain the identifier $IdSB_1$ of the first base station $SB_1$.

Upon receiving this message MSG', the steps F1 and G21 to G24 previously described are implemented by the unit of communications equipment $PE_2$ in order to establish a pseudo-wire for the direction of communication—unit of communications equipment $PE_2$ toward unit of communications equipment $PE_1$.

When data is transmitted via the pseudo-wire T, the label $lbl_1$ is added by the second unit of communications equipment $PE_2$ in the header of the data intended to be sent toward the first unit of communications equipment $PE_1$. Similarly, a label $lbl_2$ is added by the first unit of communications equipment $PE_1$ in the header of the data intended to be sent toward the second unit of communications equipment $PE_2$.

FIG. 8 shows a base station $SB_i$ implementing the method of communication which is a subject of the invention.

Such a base station $SB_i$ comprises means of selection 10 of a neighboring base station from amongst a plurality of neighboring base stations according to the ANR technique.

The selection means 10 are connected to the input of first means of generation 11 of a message MSG intended to be transmitted to the mobility management equipment MME.

The selection means 10 are also connected to the input of second means of generation 12 of a message MSG1 intended to be transmitted to the unit of communications equipment $PE_i$ to which the base station $SB_i$ is connected.

The first generation means 11 and the second generation means 12 are connected to the input of means for transmission 13 of the messages MSG and MSG1 via the link L1.

FIG. 9A shows a unit of communications equipment $PE_i$ implementing the method for establishing a link which is a subject of the invention.

Such a unit of communications equipment $PE_i$ comprises means 20 for receiving or for intercepting a message MSG, MSG1 sent by the base station $SB_i$ connected to the unit of communications equipment $PE_i$.

The reception or interception means 20 are connected to the input of means of extraction 21 of the identifier of the base station $IdSB_i$ connected to the unit of communications equipment $PE_i$, and the identifier of the neighboring base station $IdSB_{neighbor}$.

The extraction means 21 are connected to the input of means 22 for establishing a link T between the unit of communications equipment $PE_i$ and the unit of communications equipment $PE_{neighbor}$ to which is connected the neighboring base station $SB_{neighbor}$.

FIG. 9B shows a unit of communications equipment according to the first and second embodiments of the invention.

Such a unit of communications equipment $PE_i$ comprises means 20 for receiving or for intercepting a message MSG, MSG1 sent by the base station $SB_i$ connected to the unit of communications equipment $PE_i$.

The reception or interception means 20 are connected to the input of means of extraction 21 of the identifier of the base station $IdSB_i$ connected to the unit of communications equipment $PE_i$, and the identifier of the neighboring base station $IdSB_{neighbor}$.

The extraction means 21 are connected to the input of storage means 23 for the identifier of the base station $IdSB_i$ and the identifier of the neighboring base station $IdSB_{neighbor}$.

The storage means 23 are connected to the input of broadcasting/receiving means 24 capable of broadcasting, to other communications equipment, the identifier of the base station $IdSB_i$ as an identifier of a route allowing a connection to the first base station $SB_i$.

The broadcasting/receiving means 24 are also capable of receiving, from the other communications equipment, the identifiers of the base stations connected to each of them, as route identifiers allowing a connection to them.

The broadcasting/receiving means 24 are connected to the input of means of comparison 25 of the identifiers of the base stations received by the broadcasting/receiving means 24 with the identifier of the base station $IdSB_{neighbor}$ stored in the storage means 23.

In the case where one of the broadcast identifiers of base stations is identical to the identifier of the base station $IdSB_{neighbor}$ extracted, the unit of communications equipment $PE_i$ stores in the storage means 23 the identifier $IdSB_{neighbor}$ of the route allowing a connection to the base station $SB_{neighbor}$.

FIG. 9C shows a unit of communications equipment according to the third embodiment of the invention.

Such a unit of communications equipment $PE_i$ comprises means 20 for receiving or for intercepting a message MSG, MSG1 sent by the base station $SB_i$ connected to the unit of communications equipment $PE_i$.

The reception or interception means 20 are connected to the input of means of extraction 21 of the identifier of the base station $IdSB_i$ connected to the unit of communications equipment $PE_i$ and the identifier of the neighboring base station $IdSB_{neighbor}$.

The extraction means 21 are connected to the input of storage means 30 for the identifier of the base station $IdSB_i$ and the identifier of the neighboring base station $IdSB_{neighbor}$.

The storage means 30 are connected to the input of means 31 for creation of a first point of attachment SAII of the pseudo-wire in the unit of communications equipment $PE_i$. Such a point of attachment has as identifier the identifier of the base station $IdSB_i$.

The storage means 30 are also connected to the input of means 32 for determining an identifier of a point of attachment TAII of the pseudo-wire in the unit of communications equipment $PE_{neighbor}$. Such an identifier of the point of attachment TAII is the identifier of the base station $IdSB_{neighbor}$ comprised in the message MSG, MSG1.

The creation means 31 and the determination means 32 are connected to the input of means of transmission 34 of a request for establishing a pseudo-wire T.

The invention claimed is:

1. A method for establishing a link in an Open Systems Interconnection (OSI) layer 2 or 3 via which at least one data stream is intended to be transmitted, a first router and a second router respectively forming a first and a second end of the link, a first base station being connected to the first router, and a second base station being connected to the second router, wherein the first base station has selected the second base station from amongst a plurality of base stations in anticipation of and before a handover procedure, the method being implemented by the first router and comprising:
   in anticipation of and before the handover procedure, extracting an identifier of the first base station and an identifier of the second base station comprised in a message transmitted by the first base station;
   in anticipation of and before the handover procedure, creating a first point of attachment in the first router, the first point of attachment intended to form the first end of the link, wherein an identifier of the first point of attachment comprises the identifier of the first base station;
   in anticipation of and before the handover procedure, determining the identifier of the second base station as an identifier of a second point of attachment in the second router, the second point of attachment intended to form the second end of the link; and
   in anticipation of and before the handover procedure, sending a request for establishing the link to the second router, the request for establishing the link comprising the identifier of the first point of attachment and the identifier of the second point of attachment.

2. A method of communication between a first base station and a first router to which the first base station is connected, the first base station having selected from amongst a plurality of base stations, in anticipation of and before a handover procedure, a second base station connected to a second router, a link in the Open Systems Interconnection (OSI) layer 2 or 3 via which at least one data stream is intended to be transmitted, the link being intended to be established between the first router and the second router, wherein the method comprises:
   in anticipation of and before the handover procedure, sending a message to the first router, the message comprising an identifier of the first base station and an identifier of the second base station, wherein a first point of attachment is created in the first router in anticipation of and before the handover procedure, the first point of attachment intended to form a first end of the link, wherein an identifier of the first point of attachment comprises the identifier of the first base station, wherein an identifier of a second point of attachment in the second router comprises the identifier of the second base station, the second point of attachment intended to form a second end of the link.

3. A router forming a first end of a link in the Open Systems Interconnection (OSI) layer 2 or 3 via which at least one data stream is intended to be transmitted, a second router forming a second end of the link, a first base station being connected to the router, and a second base station being connected to the second router, wherein the first base station has selected the second base station from amongst a plurality of base stations in anticipation of and before a handover procedure, wherein the router includes circuitry that is configured to:
   in anticipation of and before the handover procedure, extract an identifier of the first base station and an identifier of the second base station comprised in a message sent by the first base station, and
   in anticipation of and before the handover procedure, establish the link between the router and the second router based on the identifier of the first base station and on the identifier of the second base station extracted,
   wherein a first point of attachment is created in the router in anticipation of and before the handover procedure, the first point of attachment intended to form the first end of the link, wherein an identifier of the first point of attachment comprises the identifier of the first base station, wherein an identifier of a second point of attachment in the second router comprises the identifier of the second base station, the second point of attachment intended to form the second end of the link.

4. A base station, connected to a first router and having selected from amongst a plurality of base stations, in anticipation of and before a handover procedure, a second base station connected to a second router, a link in the Open Systems Interconnection (OSI) layer 2 or 3 via which at least one data stream is intended to be transmitted, the link being intended to be established between the first router and the second router, wherein the base station includes circuitry that is configured to:
   send a message to the first router in anticipation of and before the handover procedure, the message comprising an identifier of the first base station and an identifier of the second base station, wherein a first point of attachment is created in the first router in anticipation of and before the handover procedure, the first point of attachment intended to form a first end of the link, wherein an identifier of the first point of attachment comprises the identifier of the base station, wherein an identifier of a second point of attachment in the second router comprises the identifier of the second base station, the second point of attachment intended to form a second end of the link.

5. A non-transitory computer-readable medium comprising computer-executable instructions that, when executed by a processor, implement the method for establishing a link as claimed in claim 1 when the program is executed by a processor.

6. A non-transitory computer-readable medium comprising computer-executable instructions that, when executed by a processor, implement the method of communication as claimed in claim 2.

* * * * *